United States Patent [19]

Reilly et al.

[11] Patent Number: 5,503,769
[45] Date of Patent: Apr. 2, 1996

[54] METHOD OF MAKING AN UNACTIVATED YTTRIUM TANTALATE X-RAY PHOSPHOR

[75] Inventors: Kenneth T. Reilly; Richard G. W. Gingerich; Richard R. Borchardt, all of Towanda, Pa.

[73] Assignee: Osram Sylvania Inc., Danvers, Mass.

[21] Appl. No.: 468,506

[22] Filed: Jun. 6, 1995

Related U.S. Application Data

[63] Continuation of Ser. No. 235,826, Apr. 29, 1994, abandoned.
[51] Int. Cl.$^6$ .............................. C09K 11/80; C01F 7/02
[52] U.S. Cl. .................. 252/301.4 R; 423/263; 423/593
[58] Field of Search ............... 252/301.4 R; 423/263, 423/593

[56] References Cited

U.S. PATENT DOCUMENTS

| | | | |
|---|---|---|---|
| 4,925,702 | 5/1990 | Reddy | 252/301.4 R |
| 5,064,729 | 11/1991 | Zegarski | 252/301.4 R |
| 5,112,524 | 5/1992 | Reddy et al. | 252/301.4 R |

*Primary Examiner*—C. Melissa Bonner
*Attorney, Agent, or Firm*—Robert F. Clark

[57] ABSTRACT

A method of making an unactivated yttrium tantalate x-ray phosphor containing an aluminum additive wherein a high brightness phosphor is obtained without the use of a lithium chloride containing flux. The method includes using a high surface area aluminum oxide as the source of the aluminum additive and a lithium sulfate flux.

6 Claims, No Drawings

METHOD OF MAKING AN UNACTIVATED YTTRIUM TANTALATE X-RAY PHOSPHOR

CROSS-REFERENCES TO RELATED APPLICATIONS

This application is a continuation of application Ser. No. 08/235,826, filed Apr.29, 1994, now abandoned.

TECHNICAL FIELD

This invention relates to methods of making yttrium tantalate phosphors. More particularly, this invention relates to methods of making unactivated yttrium tantalate x-ray phosphors containing aluminum additives.

BACKGROUND ART

Examples of methods of making yttrium tantalate x-ray phosphors are taught in U.S. Pat. Nos. 4,970,024, 5,009,807, 5,112,524 and 5,141,673. In particular, U.S. Pat. No. 5,112,524 teaches that small additions of aluminum, strontium and rubidium, between 0.001 and 0.1 moles per mole of yttrium tantalate, increase the brightness of unactivated yttrium tantalate x-ray phosphors. However, to obtain higher brightness, it has been necessary to use a lithium chloride containing flux to form the unactivated yttrium tantalate phosphor containing the aluminum additive. In particular, the prior art teaches that the highest brightness is obtained when a lithium chloride-lithium sulfate, $(LiCl)_2$-$Li_2SO_4$, eutectic flux is used. However, because of its corrosiveness and volatility during firing, the lithium chloride in the flux causes significant damage to the alumina firing crucibles and the refractory brick lining in the firing furnace. Additionally, the lithium chloride is the more expensive component of the $(LiCl)_2$-$Li_2SO_4$ eutectic flux and its presence in the flux makes it more difficult and less economical to reclaim the flux from the process waste streams. Thus, it would be a great advantage to be able to produce an unactivated yttrium tantalate phosphor containing an aluminum additive and having a brightness equivalent to or greater than those produced by the prior art methods without having to use a lithium chloride containing flux.

SUMMARY OF THE INVENTION

It is an object of the invention to obviate the disadvantages of the prior art.

It is a further object of this invention to produce a yttrium tantalate x-ray phosphor containing an aluminum additive without using a lithium chloride flux. The phosphor having a brightness equivalent to or greater than the same phosphor made by a process using a lithium chloride containing flux.

In accordance with one aspect the invention, a yttrium tantalate x-ray phosphor containing an aluminum additive is made by the steps of:

forming a uniform mixture of yttrium oxide, tantalum pentoxide, aluminum oxide and, optionally, strontium carbonate in amounts necessary to make the unactivated yttrium tantalate phosphor, the aluminum oxide having a surface area of about 100 $m^2/g$;

combining the uniform mixture with a lithium sulfate flux;

firing the mixture for a time and temperature sufficient to make the unactivated yttrium tantalate phosphor containing an aluminum additive, the phosphor having a brightness equivalent to or greater than the same phosphor made by a method using a lithium chloride containing flux.

DESCRIPTION OF THE PREFERRED EMBODIMENTS

For a better understanding of the present invention, together with other and further objects, advantages and capabilities thereof, reference is made to the following disclosure and appended claims.

Samples of unactivated yttrium tantalate containing aluminum and, optionally, strontium additives were prepared using a conventional low surface area (LSA) anhydrous aluminum oxide powder obtained from Fisher Scientific of New Jersey (Lot No. 926357A) and Aluminum Oxide C (AOC), a high surface area aluminum oxide powder obtained from Degussa Corporation of New Jersey. The LSA alumina had a BET surface area of 0.54 $m^2/g$ and a 50% particle size of 8.9 microns, as determined by a Coulter Counter particle sizer. The Aluminum Oxide C had a BET surface area of 100±15 $m^2/g$ and an average particle size of about 20 nanometers. Strontium carbonate was added to the mixture in Examples 5 and 6 to further enhance brightness. The unactivated yttrium tantalate phosphors of this invention can be formed over a broad range of firing times and temperatures from about 1250° C. to about 1375° C. and from about 0.1 to 24 hours. However, the preferred firing temperature is between about 1290° C. and 1310° C. and the preferred firing time is between about 9 to about 15 hours.

The following non-limiting examples are presented.

EXAMPLE 1

As raw materials, 112.94 grams of yttrium oxide, $Y_2O_3$, and 220.94 grams of tantalum pentoxide, $Ta_2O_5$, were placed in a plastic container containing glass beads and intimately mixed on a mechanical shaker for 30 minutes to form a uniform mixture. The mixed oxides were separated from the glass beads using a commercial sieve and then combined with 184.0 grams of a lithium sulfate, $Li_2SO_4$, flux. The flux containing mixture was charged into a covered alumina crucible and placed into an electric furnace at 800° C. The temperature of the furnace was linearly increased to 1300° C. over a 6 hour period and then held at 1300° C. for 12 hours after which the furnace was cooled back down to 800° C. and the crucible removed. Once cooled, the fired material was removed from the crucible and washed with water to remove the flux. The phosphor was further finished by drying to remove moisture, sieving through a 46 micron nylon screen, mixing with 0.02 percent by weight of silica, $SiO_2$, re-sieving through a 46 micron nylon screen and blending.

EXAMPLE 2

Same as Example 1 except the flux was a eutectic mixture of 75.0 grams of lithium chloride, LiCl and 92.0 grams of lithium sulfate, $Li_2SO_4$.

EXAMPLE 3

Same as Example 1 except that 1.102 grams of the Aluminum Oxide C were added to the oxide mixture.

EXAMPLE 4

Same as Example 2 except that 2.039 grams of the low surface area aluminum oxide were added to the oxide mixture.

EXAMPLE 5

Same as Example 1 except that 1.63 grams of the Aluminum Oxide C and 3.69 grams of strontium carbonate, $SrCO_3$, were added to the oxide mixture.

EXAMPLE 6

Same as Example 2 except that 1.63 grams of the low surface area aluminum oxide and 3.69 grams of strontium carbonate were added to the oxide mixture.

Brightness measurements of the phosphors in the foregoing examples were made by X-ray optical fluorescence (XOF) and compared with a standard unactivated yttrium tantalate x-ray phosphor. The brightness of the standard phosphor was normalized at 100. Table 1 gives the XOF brightness of these samples relative to the unactivated yttrium tantalate standard. The unactivated yttrium tantalate phosphors emit in the UV-blue region of the spectrum with an emission maximum at about 340 nm.

TABLE 1

| Example | $Al_2O_3$ | $SrCO_3$ | Flux | XOF Brightness |
| --- | --- | --- | --- | --- |
| 1 | — | — | $Li_2SO_4$ | 123 |
| 2 | — | — | $(LiCl)_2$—$Li_2SO_4$ | 132 |
| 3 | 1.102 g AOC | — | $Li_2SO_4$ | 141 |
| 4 | 2.039 g LSA | — | $(LiCl)_2$—$Li_2SO_4$ | 143 |
| 5 | 1.63 g AOC | 3.69 g | $Li_2SO_4$ | 151 |
| 6 | 1.63 g LSA | 3.69 g | $(LiCl)_2$—$Li_2SO_4$ | 131 |

Table 1 shows that the unactivated yttrium tantalate phosphors made with the high surface area alumina, AOC, and without the use of a lithium chloride containing flux (Examples 3 and 5) have a brightness which is equivalent to or greater than the corresponding phosphors made with the low surface area alumina, LSA, and a lithium chloride containing flux (Examples 4 and 6). The highest brightness material being obtained in Example 5 using AOC and strontium carbonate. Thus, the present invention clearly provides the significant advantage of making a high brightness yttrium tantalate x-ray phosphor containing an aluminum additive without having to use a lithium chloride containing flux.

While there has been shown and described what are at the present considered the preferred embodiments of the invention, it will be obvious to those skilled in the art that various changes and modifications may be made therein without departing from the scope of the invention as defined by the appended claims.

We claim:

1. A method for making an unactivated yttrium tantalate x-ray phosphor containing an aluminum additive, comprising the steps of:

forming a uniform mixture of yttrium oxide, tantalum pentoxide, a high surface area aluminum oxide and, optionally, strontium carbonate in amounts necessary to make the unactivated yttrium tantalate phosphor;

combining the uniform mixture with a lithium sulfate flux;

firing the mixture for a time and temperature sufficient to make the unactivated yttrium tantalate phosphor containing an aluminum additive, the phosphor having a brightness equivalent to or greater than the same phosphor made by a method using a lithium chloride containing flux and a low surface area aluminum oxide.

2. The method of claim 1 wherein the method further includes a finishing step comprising washing the phosphor to remove the flux.

3. The method of claim 2 wherein the finishing step further includes drying, sieving, mixing the phosphor with 0.02 percent by weight silica, re-sieving, and blending the phosphor.

4. The method of claim 1 wherein the firing temperature is from about 1250° C. to about 1375° C. and the firing time is between about 0.1 to about 24 hours.

5. The method of claim 1 wherein the firing temperature is from about 1290° C. to about 1310° C. and the firing time is between about 9 to about 15 hours.

6. The method of claim 1 wherein the high surface area aluminum oxide has a surface area of about 100 $m^2/g$.

* * * * *